United States Patent
Yamane et al.

(10) Patent No.: US 12,022,892 B2
(45) Date of Patent: Jul. 2, 2024

(54) SYSTEM AND METHOD FOR SOCIAL-PHYSICAL HAPTIC INTERACTION

(71) Applicants: Honda Motor Co., Ltd., Tokyo (JP); The Board of Trustees of the Leland Stanford Junior University, Stanford, CA (US)

(72) Inventors: Katsu Yamane, Mountain View, CA (US); Allison M. Okamura, Mountain View, CA (US); Cara M. Nunez, Cambridge, MA (US); Brian H. Do, Stanford, CA (US)

(73) Assignee: HONDA MOTOR CO., LTD., Tokyo (JP)

( * ) Notice: Subject to any disclaimer, the term of this patent is extended or adjusted under 35 U.S.C. 154(b) by 115 days.

(21) Appl. No.: 17/705,951

(22) Filed: Mar. 28, 2022

(65) Prior Publication Data

US 2023/0071068 A1    Mar. 9, 2023

Related U.S. Application Data

(60) Provisional application No. 63/241,835, filed on Sep. 8, 2021.

(51) Int. Cl.
*G08B 6/00* (2006.01)
*A41D 1/00* (2018.01)
*A41D 1/04* (2006.01)
*G06F 3/01* (2006.01)

(52) U.S. Cl.
CPC .............. *A41D 1/002* (2013.01); *A41D 1/04* (2013.01); *G06F 3/016* (2013.01); *G08B 6/00* (2013.01)

(58) Field of Classification Search
CPC .......... A41D 1/002; A41D 1/04; G06F 3/016; G08B 6/00; G06N 3/08; G06N 3/0464
USPC ....................................................... 715/702
See application file for complete search history.

(56) References Cited

U.S. PATENT DOCUMENTS

| | | | |
|---|---|---|---|
| 2013/0123570 A1* | 5/2013 | Ly | A61M 21/02 600/27 |
| 2019/0054374 A1* | 2/2019 | Pesante | A63F 13/285 |
| 2022/0057857 A1* | 2/2022 | Aslandere | G06F 3/011 |

OTHER PUBLICATIONS

Duvall et al. (Active "Hugging" Vest for Deep Touch Pressure Therapy, pp. 1-6) (Year: 2016).*
Delazio et al. (Force Jacket: Pneumatically-Actuated Jacket for Embodied Haptic Experiences, published Apr. 2018, pp. 1-12) (Year: 2018).*

(Continued)

*Primary Examiner* — Shahid K Khan
*Assistant Examiner* — Ahamed I Nazar
(74) *Attorney, Agent, or Firm* — RANKIN, HILL & CLARK LLP

(57) ABSTRACT

A system and method for social-physical haptic interaction that include receiving sensor data from a plurality of sensors that are disposed within a haptic vest. The system and method also include training a neural network with at least one haptic interaction profile based on the sensor data. The system and method additionally include analyzing at least one haptic interaction profile during execution of at least one haptic application. The system and method further include electronically controlling the haptic vest to provide haptic feedback during the execution of at least one haptic application that is based on at least one haptic interaction profile.

20 Claims, 6 Drawing Sheets

(56) References Cited

OTHER PUBLICATIONS

Tsetserukou (HaptiHug: A Novel Haptic Display for Communication of Hug over a Distance, published 2010, pp. 1-8) (Year: 2010).*
Neviarouskaya et al. "EmoHeart: Conveying Emotions in Second Life Based on Affect Sensing from Text", pp. 1-13 (Year: 2009).*
Tsetserukou et al. "iFeel_IM !: A Cyberspace System for Communication of Touch-Mediated Emotions", pp. 1-8 (Year: 2013).*
N. Agharese, T. Cloyd, L. H. Blumenschein, M. Raitor, E. W. Hawkes, H. Culbertson, and A. M. Okamura, "HapWRAP: Soft growing wearable haptic device," in IEEE International Conference on Robotics and Automation, 2018, pp. 5466-5472.
A. Delazio, K. Nakagaki, R. Klatzky, S. Hudson, J. Lehman, and A. Sample, "Force Jacket: Pneumatically-Actuated Jacket for Embodied Haptic Experiences," in ACM Conference on Human Factors in Computing Systems, 2018, pp. 1-12.
B. H. Do, A. M. Okamura, K. Yamane, and L. H. Blumenschein, "Macro-Mini Actuation of Pneumatic Pouches for Soft Wearable Haptic Displays," in IEEE International Conference on Robotics and Automation, in press, 2021.
G. A. Gescheider, Psychophysics: The Fundamentals. Lawrence Erlbaum Associates, Inc., 1997.
S. Kanjanapas, C. M. Nunez, S. R. Williams, A. M. Okamura, and M. Luo, "Design and Analysis of Pneumatic 2-DoF Soft Haptic Devices for Shear Display," IEEE Robotics and Automation Letters, vol. 4, No. 2, pp. 1365-1371, 2019.
R. Niiyama, X. Sun, C. Sung, B. An, D. Rus, and S. Kim, "Pouch motors: Printable soft actuators integrated with computational design," Soft Robotics, vol. 2, No. 2, pp. 59-70, 2015.
C. Rognon, M. Koehler, C. Duriez, D. Floreano, and A. M. Okamura, "Soft Haptic Device to Render the Sensation of Flying Like a Drone," IEEE Robotics and Automation Letters, vol. 4, No. 3, pp. 2524-2531, 2019.
M. Salvato, S. R. Williams, C. M. Nunez, X. Zhu, A. Israr, F. Lau, K. Klumb, F. Abnousi, A. M. Okamura, and H. Culbertson, "Datadriven sparse skin stimulation can convey social touch information to humans," IEEE Transactions on Haptics, In press 2022. [Online]. Available: https://doi.org/10.1109/TOH.2021.3129067.
I. Sardellitti, J. Park, D. Shin, and O. Khatib, "Air Muscle Controller Design in the Distributed Macro-Mini (DM2) Actuation Approach," in IEEE International Conference on Intelligent Robots and Systems, 2007, pp. 1822-1827.
A. Shtarbanov, "FlowIO Development Platform—the Pneumatic "Raspberry Pi" for Soft Robotics," in CHI Extended Abstracts on Human Factors in Computing Systems, 2021, p. 1-6.
N. Takahashi, R. Okazaki, H. Okabe, H. Yoshikawa, K. Aou, S. Yamakawa, M. Yokoyama, and H. Kajimoto, "Sense-Roid: Emotional Haptic Communication with Yourself," in Virtual Reality International Conference, 2011, p. 1-4.
J. K. S. Teh, A. D. Cheok, R. L. Peiris, Y. Choi, V. Thuong, and S. Lai, "Huggy Pajama: A Mobile Parent and Child Hugging Communication System," in ACM International Conference on Interaction Design and Children, 2008, pp. 250-257.
S.-Y. Teng, T.-S. Kuo, C. Wang, C.-h. Chiang, D.-Y. Huang, L. Chan, and B.-Y. Chen, "PuPoP: Pop-up Prop on Palm for Virtual Reality," in ACM UIST, 2018, p. 5-17.
K. T. Yoshida, C. M. Nunez, S. R. Williams, A. M. Okamura, and M. Luo, "3-DoF Wearable, Pneumatic Haptic Device to Deliver Normal, Shear, Vibration, and Torsion Feedback," in IEEE World Haptics Conference, 2019, pp. 97-102.

\* cited by examiner

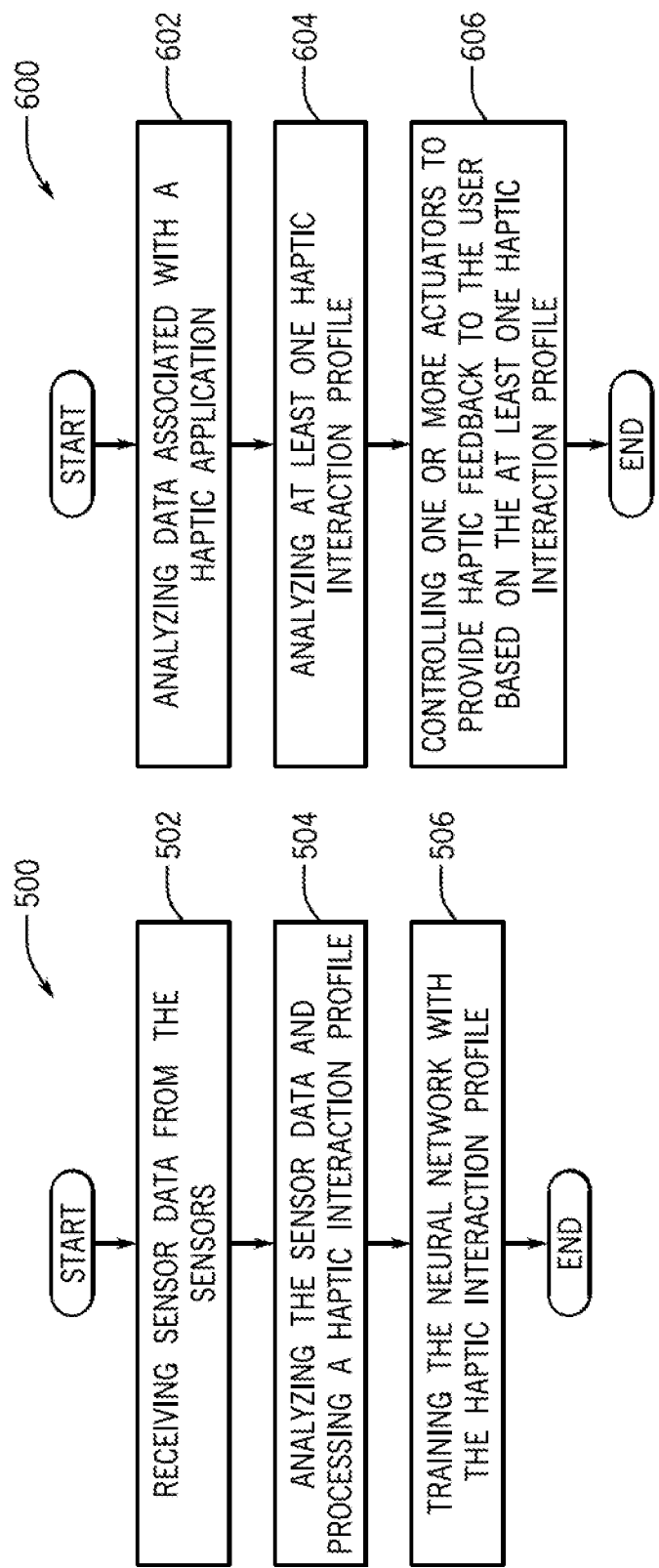

SYSTEM AND METHOD FOR SOCIAL-PHYSICAL HAPTIC INTERACTION

CROSS-REFERENCE TO RELATED APPLICATION

This application claims priority to U.S. Provisional Application Ser. No. 63/241,835 filed on Sep. 8, 2021, which is expressly incorporated herein by reference.

BACKGROUND

While most haptic devices have focused on the fingertips and hands due to their high mechanoreceptor density, the relatively small surface area of such devices may limit the types of applications in which they can be used. As a result, researchers have investigated using other locations on the body to convey haptic sensations. In general, most prior work in haptic devices have focused on providing vibrotactile feedback via distributed embedded actuators to provide vibrotactile sensations that are localized to a relatively small portions of a user's body (e.g., hands).

BRIEF DESCRIPTION

According to one aspect, a system for social-physical haptic interaction that includes a vest that includes a controller that is included as part of the vest and is operably connected to a plurality of actuators that are respectively associated with inflatable pouches. The system also includes an air pressure regulator that is connected to the actuators through solenoid valves to inflate the inflatable pouches. The system further includes a plurality of sensors that are integrated within the vest that are configured to collect pressure sensing values that pertain to pressure that is applied to particular portions of the vest to train a neural network with at least one haptic interaction profile. The controller is configured to provide signals to inflate the inflatable pouches and deflate the inflatable pouches to provide haptic feedback based on at least one haptic interaction profile.

According to another aspect, a computer-implemented method for social-physical haptic interaction that includes receiving sensor data from a plurality of sensors that are disposed within a haptic vest. The sensor data includes pressure sensing values that pertain to pressure that is applied to particular portions of the haptic vest. The computer-implemented method also includes training a neural network with at least one haptic interaction profile based on the sensor data. The computer-implemented method additionally includes analyzing the at least one haptic interaction profile during execution of at least one haptic application. The computer-implemented method further includes electronically controlling the haptic vest to provide haptic feedback during the execution of the at least one haptic application that is based on the at least one haptic interaction profile.

According to yet another aspect, a non-transitory computer readable storage medium storing instruction that when executed by a computer, which includes a processor perform a method, the method includes receiving sensor data from a plurality of sensors that are disposed within a haptic vest. The sensor data includes pressure sensing values that pertain to pressure that is applied to particular portions of the haptic vest. The method also includes training a neural network with at least one haptic interaction profile based on the sensor data. The method additionally includes analyzing the at least one haptic interaction profile during execution of at least one haptic application. The method further includes electronically controlling the haptic vest to provide haptic feedback during the execution of the at least one haptic application that is based on the at least one haptic interaction profile.

BRIEF DESCRIPTION OF THE DRAWINGS

The novel features believed to be characteristic of the disclosure are set forth in the appended claims. In the descriptions that follow, like parts are marked throughout the specification and drawings with the same numerals, respectively. The drawing figures are not necessarily drawn to scale and certain figures can be shown in exaggerated or generalized form in the interest of clarity and conciseness. The disclosure itself, however, as well as a preferred mode of use, further objects and advances thereof, will be best understood by reference to the following detailed description of illustrative embodiments when read in conjunction with the accompanying drawings, wherein:

FIG. 5 is a process flow diagram of a method for training a neural network with one or more haptic interaction profiles based on data that is sensed by the sensors of the haptic vest;

FIG. 6 is a process flow diagram of a method for controlling the haptic vest to provide haptic feedback to the user according to an exemplary embodiment of the present disclosure.

DETAILED DESCRIPTION

Figure 1:
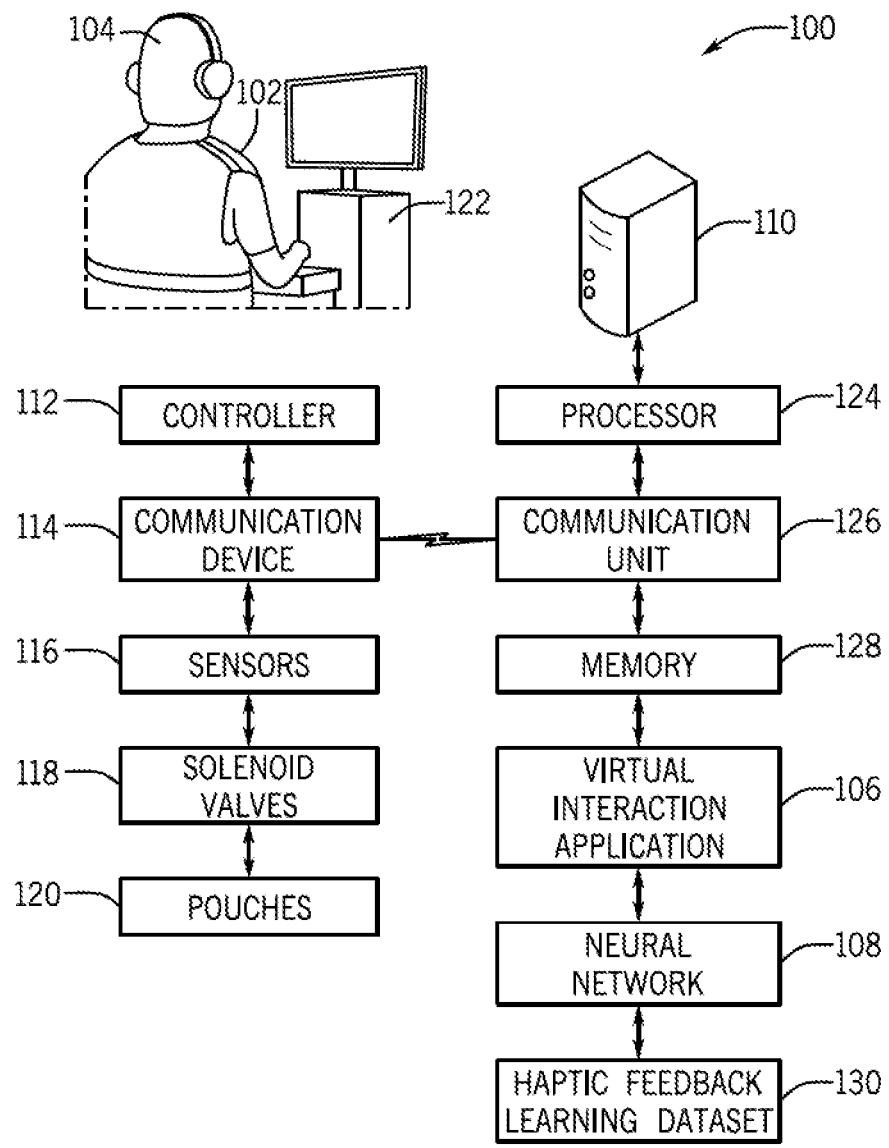
FIG. 1 is a schematic view of an exemplary operating environment for a large-area wearable soft haptic device for social-physical virtual interaction according to an exemplary embodiment of the present disclosure.

The following includes definitions of selected terms employed herein. The definitions include various examples and/or forms of components that fall within the scope of a term and that may be used for implementation. The examples are not intended to be limiting.

A "bus", as used herein, refers to an interconnected architecture that is operably connected to other computer components inside a computer or between computers. The bus may transfer data between the computer components. The bus may be a memory bus, a memory controller, a peripheral bus, an external bus, a crossbar switch, and/or a local bus, among others. The bus can also be a vehicle bus that interconnects components inside a vehicle using protocols such as Media Oriented Systems Transport (MOST), Controller Area network (CAN), Local Interconnect Network (LIN), among others.

"Computer communication", as used herein, refers to a communication between two or more computing devices (e.g., computer, personal digital assistant, cellular telephone, network device) and can be, for example, a network transfer, a file transfer, an applet transfer, an email, a hypertext transfer protocol (HTTP) transfer, and so on. A computer communication can occur across, for example, a wireless system (e.g., IEEE 802.11), an Ethernet system (e.g., IEEE 802.3), a token ring system (e.g., IEEE 802.5), a local area network (LAN), a wide area network (WAN), a point-to-point system, a circuit switching system, a packet switching system, among others.

A "disk", as used herein can be, for example, a magnetic disk drive, a solid-state disk drive, a floppy disk drive, a tape drive, a Zip drive, a flash memory card, and/or a memory stick. Furthermore, the disk can be a CD-ROM (compact disk ROM), a CD recordable drive (CD-R drive), a CD rewritable drive (CD-RW drive), and/or a digital video ROM drive (DVD ROM). The disk can store an operating system that controls or allocates resources of a computing device.

A "memory", as used herein can include volatile memory and/or non-volatile memory. Non-volatile memory can include, for example, ROM (read only memory), PROM (programmable read only memory), EPROM (erasable PROM), and EEPROM (electrically erasable PROM). Volatile memory can include, for example, RAM (random access memory), synchronous RAM (SRAM), dynamic RAM (DRAM), synchronous DRAM (SDRAM), double data rate SDRAM (DDR SDRAM), and direct RAM bus RAM (DRRAM). The memory can store an operating system that controls or allocates resources of a computing device.

A "module", as used herein, includes, but is not limited to, non-transitory computer readable medium that stores instructions, instructions in execution on a machine, hardware, firmware, software in execution on a machine, and/or combinations of each to perform a function(s) or an action(s), and/or to cause a function or action from another module, method, and/or system. A module may also include logic, a software-controlled microprocessor, a discreet logic circuit, an analog circuit, a digital circuit, a programmed logic device, a memory device containing executing instructions, logic gates, a combination of gates, and/or other circuit components. Multiple modules may be combined into one module and single modules may be distributed among multiple modules.

An "operable connection", or a connection by which entities are "operably connected", is one in which signals, physical communications, and/or logical communications may be sent and/or received. An operable connection may include a wireless interface, a physical interface, a data interface and/or an electrical interface.

A "processor", as used herein, processes signals and performs general computing and arithmetic functions. Signals processed by the processor may include digital signals, data signals, computer instructions, processor instructions, messages, a bit, a bit stream, or other means that may be received, transmitted and/or detected. Generally, the processor may be a variety of various processors including multiple single and multicore processors and co-processors and other multiple single and multicore processor and co-processor architectures. The processor may include various modules to execute various functions.

A "value" and "level", as used herein may include, but is not limited to, a numerical or other kind of value or level such as a percentage, a non-numerical value, a discrete state, a discrete value, a continuous value, among others. The term "value of X" or "level of X" as used throughout this detailed description and in the claims refers to any numerical or other kind of value for distinguishing between two or more states of X. For example, in some cases, the value or level of X may be given as a percentage between 0% and 100%. In other cases, the value or level of X could be a value in the range between 1 and 10. In still other cases, the value or level of X may not be a numerical value, but could be associated with a given discrete state, such as "not X", "slightly x", "x", "very x" and "extremely x".

I. System Overview

Referring now to the drawings, wherein the showings are for purposes of illustrating one or more exemplary embodiments and not for purposes of limiting the same, FIG. 1 is a schematic view of an exemplary operating environment 100 for providing a large-area wearable soft haptic device for social-physical virtual interaction according to an exemplary embodiment of the present disclosure.

The operating environment 100 includes a wearable soft haptic device that may be configured as a haptic vest 102 that is worn by a subject (user) 104 that may include a human user and/or a robot that may be completing one or more activities that may involve physical and/or virtual activities and/or that may involve haptic feedback that may be provided through the haptic vest 102. As discussed in more detail below, the haptic vest 102 may be configured to sense pressure upon one or more portions of the user's body through the haptic vest 102 that may be associated with real-world tactile experiences that may involve learning of social-physical virtual between the user 104 and a third party (e.g., another individual, robotic application, virtual party) to train a neural network 108 that may be executed upon an externally hosted server infrastructure (external server) 110.

In an exemplary embodiment, the haptic vest 102 may be configured to provide a sensation of soft haptic touch, pressure, and feedback to the user 104 at one or more portions of the user's body through the haptic vest 102 during the utilization of one or more haptic applications that may be accessed by the user 104. In one embodiment, the haptic vest 102 may be configured to communicate electronic signals to send and receive data between a controller 112 of the haptic vest 102 and the external server 110.

As discussed in more detail below, the external server 110 may be configured to execute a virtual interaction application 106. The virtual interaction application 106 may be configured to provide a computer-implemented execution of instructions for data gathering associated with pressure sensing based upon pressure that is received upon one or more portions of the body (e.g., torso, back) of the user 104. The sensing of pressure that may be provided to the user's body may be sensed through the haptic vest 102 that is worn by the user 104. Sensed data may be used by the virtual interaction application 106 to train the neural network 108 to learn one or more haptic interaction profiles that may pertain to the social-physical interaction between the user 104 and a third party (e.g., another individual who may interact with the user 104 in real-time).

In additional embodiments, the virtual interaction application 106 may enable the neural network 108 to be pretrained with one or more pretrained haptic profiles that may pertain to particular social-physical virtual interaction between the user 104 and elements, features, functions, and/or virtual interactions of one or more haptic applications. The one or more haptic applications may include, but may not be limited to, various virtual reality applications that pertain to virtual real-world experiences, various virtual robotic applications that pertain to human to robotic interactions, various virtual communication applications that pertain to human to human remote communications (e.g., remote social touch), various virtual gaming applications that pertain to various gaming genres, various vehicular applications that may provide feedback to a driver or passengers, various simulation type applications that pertain to the virtual simulation of real-world experiences (e.g., exercising, sports, augmented reality, teleoperation, motion guidance, etc.), and the like. The elements, features, functions, and/or virtual interactions may include, but may not be limited to, graphical elements, visual features, audio-based features, gesture-based interactions, application functionality, and the like.

In one or more embodiments, the virtual interaction application 106 may be configured to send one or more electronic command signals to the controller 112 of the haptic vest 102. The one or more electronic command signals may be sent to the controller 112 to enable haptic feedback to be provided to the user 104 that is wearing the haptic vest 102 to provide a virtual physical social interaction between the user 104 with respect to virtual interactions that may pertain to one or more of the haptic applications (e.g., remote virtual physical interaction that may be take place between the user 104 and a third party while communicating via a remote video conferencing application).

In particular, the virtual interaction application 106 may be configured to send one or more non-transitory computer implemented electronic command signals to the controller 112 of the haptic vest 102 to enable haptic feedback to be provided to the user 104 that may be based on one or more haptic interaction profiles previously trained to the neural network 108. The haptic vest 102 may thereby be controlled to provide a soft haptic stimulation to the user 104 that may resemble a sensation of soft haptic touch, pressure, and feedback to the user 104 at one or more portions of the user's body through the haptic vest 102 that may pertain to the social-physical interaction between the user 104 and a third party that may be implemented through one or more haptic applications (e.g., virtual physical interaction with a third-party).

The virtual interaction application 106 may additionally be configured to send non-transitory computer implemented electronic command signals to the controller 112 of the haptic vest 102 to enable haptic feedback to be provided to the user 104 that may be based on the one or more pretrained haptic interaction profiles to provide a soft haptic stimulation to the user 104. The soft haptic stimulation may be provided in a manner to resemble a sensation of soft haptic touch, pressure, and feedback to the user 104 that may pertain to particular social-physical virtual interaction between the user 104 and one or more elements, features, functions, and/or virtual interactions of one or more haptic applications (e.g., a virtual gaming element).

The virtual interaction application 106 may provide an improvement to a computer and to the technology of virtual reality, virtual robotics, virtual communications, virtual gaming, virtual vehicular applications, and virtual simulation applications with respect to providing a large area wearable soft haptic device that is configured to provide an improved level of haptic perception of the user 104 and an applied sensation of the device. The virtual interaction application 106 may enable sensors 116 of the haptic vest 102 to collect sensor data that may be used to train the neural network 108. Additionally, one or more solenoid valves 118 of the haptic vest 102 may be controlled to provide a macro-mini actuation of inflatable pouches (pouches) 120 to provide soft haptic stimulation to the user 104 that may resemble a sensation of soft haptic touch, pressure, and feedback to the user 104 at one or more portions of the user's body through the haptic vest 102. Accordingly, the control of the haptic vest 102 may enhance the social-physical interaction between the user 104 and a third party that may be implemented through one or more haptic applications.

With particular reference to the components of the haptic vest 102, the controller 112 may include internal processing memory, an interface circuit, and bus lines for transferring data, sending commands, and communicating with the plurality of components of the haptic vest 102. The controller 112 may be operably connected to a communication device 114 of the haptic vest 102. The communication device 114 may include one or more network interface cards (not shown) that may be configured to connect to one or more computing systems including, but not limited to the external server 110, through an internet cloud (not shown). In particular, the communication device 114 may be configured to provide secure communications between the haptic vest 102 and the external server 110 to send data (e.g., sensor data) from one or more components of the haptic vest 102 to the virtual interaction application 106 that may be executed by the external server 110. Additionally, the communication device 114 may be configured to provide secure communications between the haptic vest 102 and the external server 110 to receive data (e.g., commands) from the virtual interaction application 106 that may be executed by the external server 110 to the controller 112 of the haptic vest 102 to operably control one or more of the solenoid valves 118 to inflate and/or deflate one or more of the pouches 120 of the haptic vest 102.

In an exemplary embodiment, the sensors 116 of the haptic vest 102 may include, but may not be limited to, pressure sensors, capacitive touch sensors, weight sensors, motion sensors, vibration sensors, and the like that are configured to sense and determine pressure sensing values that are associated with pressure that is applied to one or more portions of the haptic vest 102 at one or more points in time. For example, the sensors 116 may be configured to determine values associated with pressure that is applied to portions of the haptic vest 102 that is near the user's chest, stomach, upper back, and/or lower back that may be applied to the user 104 when receiving a hug from a third-party. In one configuration, the sensors 116 may additionally be configured to sense motion of one or more portions of the user's body.

In some embodiments, one or more of the sensors 116 may be configured to be affixed to one or more of the pouches 120 of the haptic vest 102. As discussed below, sensor data may be output by the sensors 116 and may be communicated to the virtual interaction application 106. The sensor data may enable the virtual interaction application 106 to analyze pressure sensing values that are provided at particular portions of the haptic vest 102 to process one or more haptic interaction profiles that may pertain to the social-physical interaction between the user 104 and a third party that is associated with the pressure that is applied to one or more portions of the haptic vest 102 at one or more points in time.

In one configuration, the sensors 116 may be integrated into the pouches 120 of the haptic vest 102. For example, numerous sensors 116 may be integrated into pouches 120 that may be configured in a diagonal pattern from a top right pouch to a bottom left pouch. In addition to capturing sensor data to train the neural network 108, the sensors 116 may be configured to confirm that the pouches 120 are being controlled to inflate and deflate in accordance with one or more haptic interaction profiles that may pertain to the social-physical interaction between the user 104 and a third party and/or elements, features, functions, and/or virtual interactions of one or more haptic applications. In additional embodiments, the sensors 116 may be configured to provide closed loop control on the pressure of the pouches 120 based a determination that the pouches 120 are being controlled or not being controlled to inflate and deflate in accordance with one or more haptic interaction profiles.

In an exemplary embodiment, the haptic vest 102 may be configured with pneumatic pouch actuators (not shown) that may be configured with solenoid valves 118 to send and receive electronic signals to and from the controller 112 of the haptic vest 102. Based on command signals that may be received from the controller 112, one or more of the solenoid valves 118 may be configured to send and receive electronic signals to individually actuate one or more respective pouches 120 that may be disposed at particular portions of the haptic vest 102. The pouch actuators may be fabricated from any material that is flexible but inextensible. In some configurations, the pouch actuators may be fabricated from low density polyethylene (LDPE) tubes.

Figure 2:
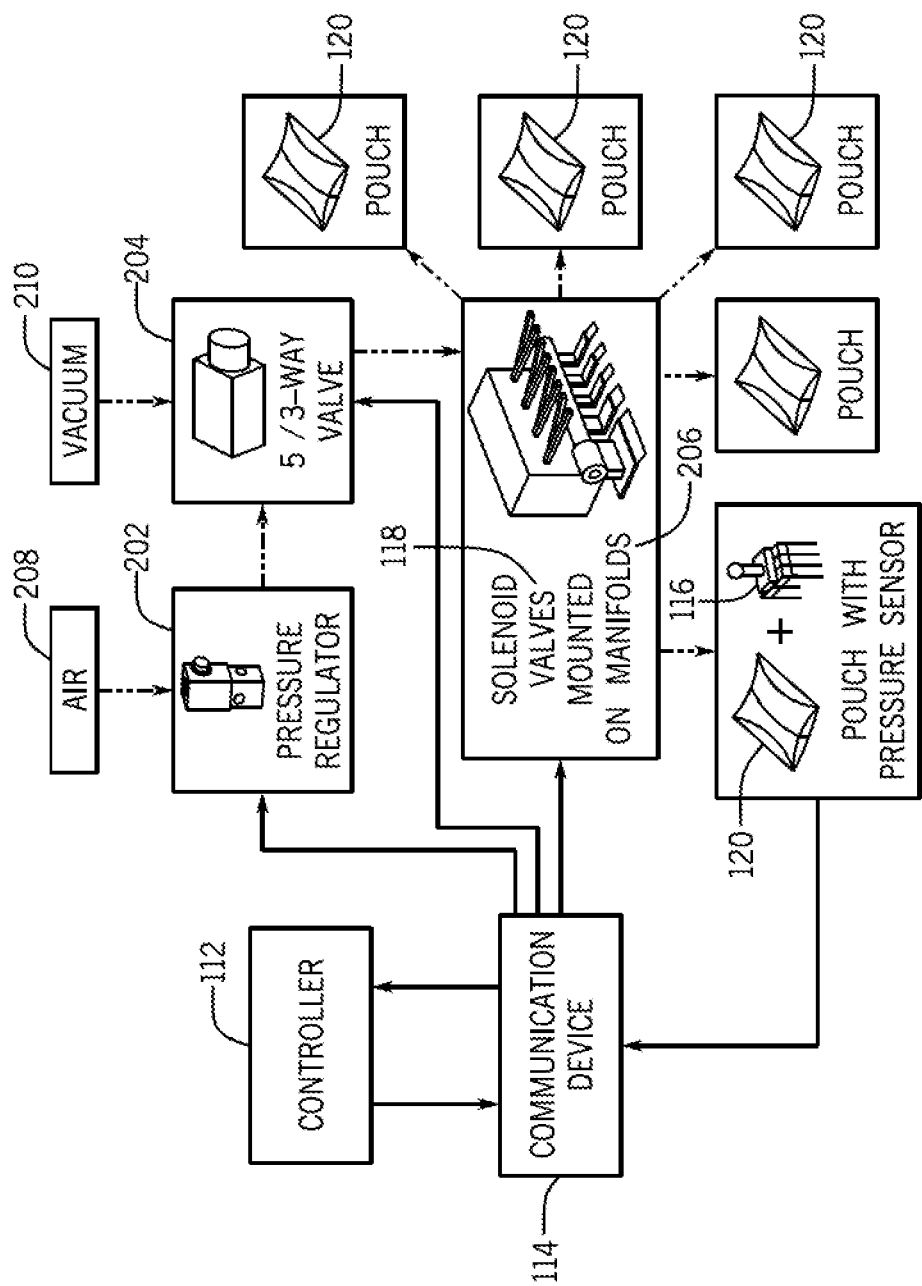
FIG. 2 is a schematic overview of the components of a haptic vest according to an exemplary embodiment of the present disclosure.

With reference to FIG. 2, a schematic overview of the components of the haptic vest 102 according to an exemplary embodiment of the present disclosure, as represented, the controller 112, communication device 114, and solenoid valves 118 are part of a pneumatic system for controlling air pressure that is provided to and/or removed from each of the pouches 120 individually. As depicted in FIG. 2, solid lines indicate the flow of electric signals and dashed lines indicate the flow of air or vacuum. For purposes of simplicity, the exemplary embodiment of FIG. 2 includes five pouches which may be configured of various sizes (e.g., large or small), however, it is appreciated that the haptic vest 102 may include any number of pouches 120 that may be disposed at various portions of the haptic vest 102 to provide haptic feedback to various portions of the user's body.

In an exemplary embodiment, the pouches 120 are configured as inflatable pouches that selectively inflate and deflate based on electric signals that may be sent from the communication device 114 that are operably connected to the solenoid valves 118 for each of the pouches 120. In particular, the virtual interaction application 106 may send command signals to the communication device 114 to enable a 5/3-way valve 204 and one or more of the solenoid valves 118 to utilize pneumatic inflation to control inflation of each of the pouches 120 with air 208 based on operation of a pressure regulator 202. The virtual interaction application 106 may also send command signals to the communication device 114 to enable a 5/3-way proportional directional valve (5/3-way valve) 204 and one or more of the solenoid valves 118 to control deflation of the pouches based on operation of a vacuum 210.

The controller 112 may be configured to provide signals to inflate one or more of the pouches 120 by the pressure regulator 202 and/or deflate one or more of the pouches 120 by the vacuum 210 using respective digital high or low signals that are sent to the solenoid valves 118. In one embodiment, the pressure regulator 202 and/or the vacuum 210 may be physically attached to one or more portions of the haptic vest 102. In alternate embodiments, the pressure regulator 202 and/or the vacuum 210 may be detachable from the haptic vest 102 and may be attached (e.g., through a physical connection) for providing haptic feedback to the user 104 during operation of the haptic vest 102.

In one configuration, each of the pouches 120 may be connected to a respective solenoid valve manifold 206 containing an array of solenoid valves with six feet of ¼" outer diameter tubing followed by one foot of 5/32" outer diameter. The tubing may be configured in a size that ensures equal resistance from the tubing for each of the pouches 120.

The haptic vest 102 may be configured to include a 5/3-way valve 204 to control whether one or more of the pouches 120 should be inflated (e.g., receive commanded pressure) by the pressure regulator 202 or deflated by the vacuum 210. In one or more embodiments, the sensors 116 may be integrated into one or more of the pouches 120 and/or embedded via an alternative method on the haptic vest 102. Accordingly, pressure sensing values may be determined from various portions of the haptic vest 102 to process one or more haptic interaction profiles that may pertain to the social-physical interaction between the user 104 and a third party that is associated with the pressure that is applied to one or more portions of the haptic vest 102 during a real-world social-physical interaction between the user 104 and the third party at one or more points in time.

A pulse width modulation (PWM) signal may be sent from the controller 112 and/or the communication device 114 to the pressure regulator 202 and/or the 5/3-way valve 204 to switch between no airflow, allowing air flow, or vacuum flow. The PWM signal may be sent to the pressure regulator 202 to command a specific output pressure. In one embodiment, the controller 112 may be configured to collect pressure sensor data using analog input pins based on data that may be communicated via serial communication.

The operation of the virtual interaction application 106 may enable the haptic vest 102 to provide haptic feedback to particular portions of the user's body based on the operation of the pressure regulator 202, the 5/3-way valve 204, and the solenoid valves 118 to thereby selectively inflate and deflate one or more of the pouches 120 that may be disposed at one or more portions of the haptic vest 102. Accordingly, the user 104 may be provided with a sensation of soft haptic touch, pressure, and feedback through the haptic vest 102 at one or more portions of the user's body that may be based on one or more haptic interaction profiles that may pertain to the social-physical interaction between the user 104 and a third party and/or one or more pretrained haptic profiles that may pertain to particular social-physical interaction between the user 104 and elements, features, functions, and/or virtual interactions of one or more haptic applications.

Figures 3A, 3B:
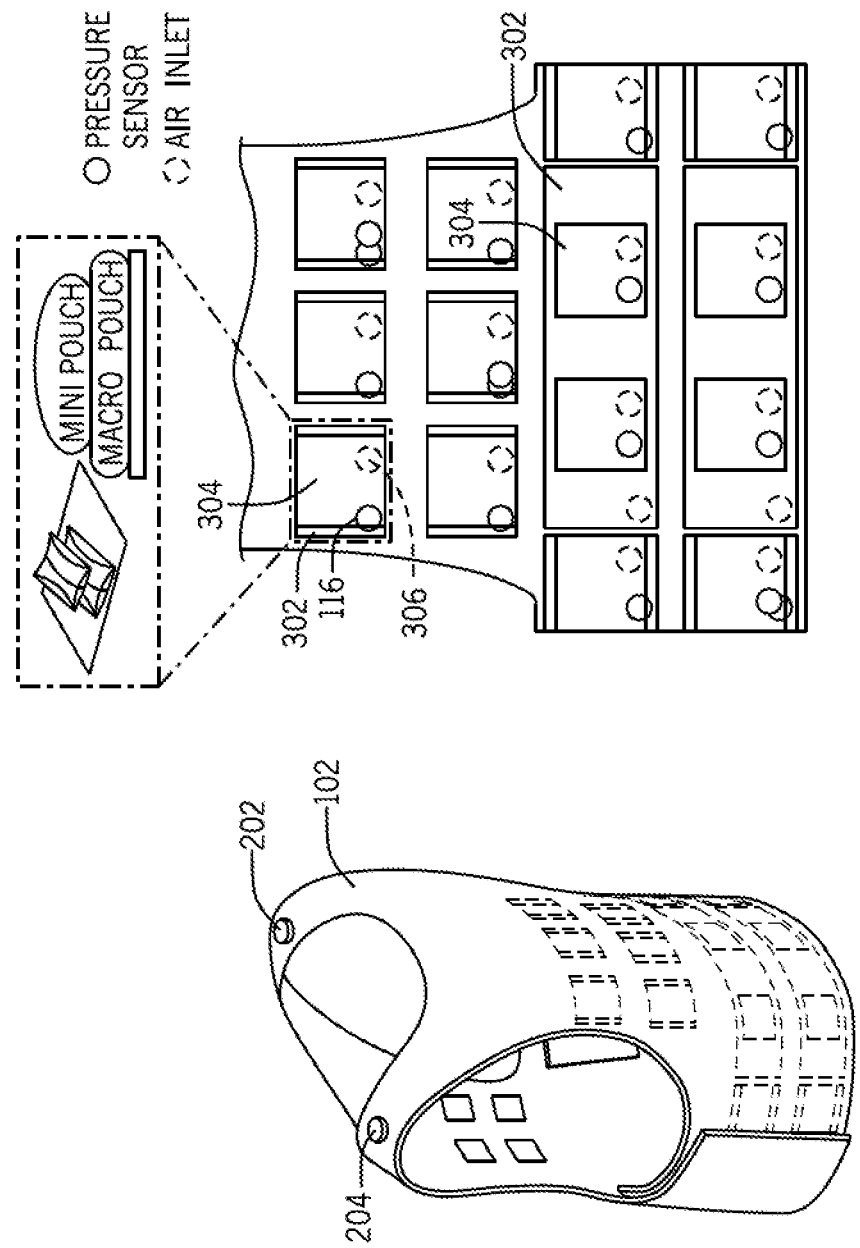
FIG. 3A is an illustrative example of the haptic vest according to an exemplary embodiment of the present disclosure.
FIG. 3B is a schematic overview of pouches that may be included as part of the haptic vest according to an exemplary embodiment of the present disclosure.

FIG. 3A is an illustrative example of the haptic vest 102 according to an exemplary embodiment of the present disclosure. In the illustrative example of FIG. 3A, the haptic vest 102 is configured as a wearable sleeveless vest that may be configured to be worn by the user 104 with or without an undershirt. In alternate embodiments, the haptic vest 102 may be attached to an undershirt, a long-sleeve shirt, a jacket, and/or additional garments. In one configuration, the haptic vest 102 may be configured as soft wearable device that is lightweight and may provide a comfortable interface with respect to the user's body. In some configurations, the haptic vest 102 may be thin and be configured to drape over the user's shoulders and be secured via Velcro on the front of the haptic vest 102. However, it is appreciated that various configurations, shapes, and sizes may be contemplated.

FIG. 3B is a schematic overview of the pouches 120 that may be included as part of the haptic vest 102 according to an exemplary embodiment of the present disclosure. In an exemplary embodiment, the pouches 120 may be configured in a dual layer configuration. The pouches 120 may be disposed at one or more portions of the haptic vest 102 including, but not limited to, front, sides, and back of the haptic vest 102 to sense pressure readings that may be applied to one or more portions of the user's body and/or to provide haptic feedback to one or more portions of the user's body. In one configuration, the pouches 120 may be configured in an array to apply skin compression over large portions of the user's body. The haptic vest 102 may include an n number of pouches 120 and associated actuators of the pouches 120 (e.g., 14 pouches and actuators) that may be configured to be disposed at various locations of the haptic vest 102.

In one configuration, the pouches 120 may be configured as a primary layer of inflatable pouches 302 and a secondary layer of haptic pouches 304. The primary layer of inflatable pouches 302 may be configured as inflatable pouches that may be configured to inflate to confirm the haptic vest 102 to the shape and form of the user's body. The primary layer of inflatable pouches 302 may each include an air inlet 306 that allows air to flow inward to each respective pouch to inflate each respective pouch based on operation of a respective solenoid valve 118 and the pressure regulator 202. Each air inlet 306 may also be configured to be utilized as an outlet to allow air to be released to selectively deflate each respective pouch of the primary layer of inflatable pouches 302 based on operation of the vacuum 210. In some configurations, each of the primary layer of inflatable pouches 302 may include a respective sensor 116 (e.g., pressure sensor).

In one embodiment, the primary layer of inflatable pouches 302 may be displaced on layer that is distal to the user's body such that the primary layer of inflatable pouches 302 is located upon or within an exterior layer of fabric that may be disposed upon and/or above an interior layer of fabric of the haptic vest 102. The primary layer of inflatable pouches 302 may be configured to inflate to conform the haptic vest 102 to the user's body to ensure physical contact between the secondary layer of haptic pouches 304 and portions of the body of the user 104.

In one configuration, the secondary layer of haptic pouches 304 may be each configured to be a smaller size than the primary layer of inflatable pouches 302. For example, if the pouches 120 are configured to be circular shaped pouches, the secondary layer of haptic pouches 304 may be configured to include a smaller diameter than the primary layer of inflatable pouches 302. Stated differently, the primary layer of inflatable pouches 302 may be configured as macro pouches and the secondary layer of haptic pouches 304 may be configured as mini pouches.

In an exemplary embodiment, the secondary layer of haptic pouches 304 may be configured as haptic pouches that provide haptic feedback to respective portions of the user's body that are adjacent to the respective pouches 120 based on pneumatic inflation of the secondary layer of haptic pouches 304 and/or selective deflation of the secondary layer of haptic pouches 304 through respective air inlets 306. In an alternate embodiment, additional haptic devices such as vibratory devices, compression devices, haptic feedback devices, and the like (not shown) may also be disposed upon the secondary layer of haptic pouches 304 to provide various types of haptic feedback to the user 104.

In one or more embodiments, each of the secondary layer of haptic pouches 304 may be configured to provide a soft haptic stimulation to the user 104 that may resemble a sensation of soft haptic touch, pressure, and feedback to the user 104 at one or more portions of the user's body through the haptic vest 102. For example, one or more of the secondary layer of haptic pouches 304 may be configured to provide a sensation of soft haptic touch pressure and feedback to the user 104 that may provide a sensation of receiving a hug as the user 104 is using a virtual communication application that enables a human to human remote virtual social-physical interaction between the user 104 and a third-party.

In one configuration, pouches 120 of different sizes may be stacked upon one another upon different portions of the haptic vest 102. In some configurations, the pouches 120 may be stacked such that smaller pouches of the secondary layer of haptic pouches 304 that are located proximally to the user's skin are stacked atop larger pouches of the primary layer of inflatable pouches 302 that are located more distally to the user's skin. In other words, smaller proximal pouches may be stacked on top of larger distal pouches which form a base layer. The shape, size, and configuration of the pouches 120 may allow that a consistent size, shape, and number of pouches may be used to provide haptic feedback to the user 104 regardless of the size of the haptic vest 102 and/or physical characteristics of the user 104 who is wearing the haptic vest 102.

In an exemplary embodiment, the secondary layer of haptic pouches 304 may be configured to include one or more of the sensors 116. In one configuration, one or more sensors 116 may be integrated into the pouches 120 and/or embedded via an alternative method on the haptic vest 102 to capture pressure data and/or movement data to confirm that the secondary layer of haptic pouches 304 are inflated at particular levels to provide the soft haptic stimulation to the user 104 and that the haptic vest 102 is in fact providing requisite levels of haptic feedback that provide a sensation of soft haptic touch, pressure, and feedback to the user 104 as required to provide an intended feedback (e.g., of receiving a hug) based on one or more respective haptic interaction profile.

Referring again to FIG. 1, the processor 124 of the external server 110 may be configured to execute the virtual interaction application 106. In particular, the processor 124 may be configured to execute one or more applications, operating systems, database, and the like. The processor 124 may also include internal processing memory, an interface circuit, and bus lines for transferring data, sending commands, and communicating with the plurality of components of the external server 110.

The processor 124 may be operably connected to a communication unit 126 of the external server 110. The communication unit 126 may include one or more network interface cards (not shown) that may be configured to connect to one or more computing systems through an internet cloud (not shown). In particular, the communication unit 126 may be configured to provide secure communications between the external server 110 and the haptic vest 102.

The communication unit 126 may be configured to ensure secure communication of data between the components of the haptic vest 102 to send/receive data to/from the haptic vest 102 to the virtual interaction application 106 and the neural network 108 stored upon the external server 110 through the internet cloud. In one embodiment, the processor 124 may be operably connected to a memory 128 of the external server 110. Generally, the processor 124 may communicate with the memory 128 to execute the one or more applications, operating systems, and the like that are stored within the memory 128. In one embodiment, the memory 128 may store one or more executable application files that are associated with the virtual interaction application 106.

In an exemplary embodiment, the memory 128 of the external server 110 may be configured to store the neural network 108. In one configuration, the neural network 108 may be configured as a convolutional recurrent neural network (CNN). As an CNN, the neural network 108 may execute machine learning/deep learning techniques to process and analyze sequences of data points such as pressure sensing values. The neural network 108 may be trained by populating a haptic feedback learning dataset 130 of the neural network 108 with one or more haptic interaction profiles that may pertain to the social-physical interaction between the user 104 and a third party based on sensor data that may be provided by the sensors 116 of the haptic vest 102 during a real-time interaction between the user 104 and a third party. The neural network 108 may also be pre-trained by populating the haptic feedback learning dataset 130 of the neural network 108 with one or more (pre-trained) haptic interaction profiles that may pertain to the social-physical interaction between the user 104 and elements, features, functions, and/or virtual interactions of one or more haptic applications.

The one or more haptic interaction profiles may include data associated with the real-time interaction between the user 104 and one or more particular third parties. Such data may be manually annotated by the user 104 using a graphical user interface of the computing system 122. The haptic interaction profiles may include data that may be associated with one or more gestures that may be provided by particular third parties, one or more haptic applications that pertain to a type of application, one or more features of the application, one or more functions of the application, one or more virtual interactions within the application, and the like. As an illustrative example, the haptic interaction profiles may include data that pertain to pressure sensing values that may be sensed by one or more particular sensors 116 of the haptic vest 102 as a third party hugs the user 104 in real-time. Such data may additionally include data that may be annotated with respect to an identify of the third party, a description of the third party, characteristics associated with the third party, and the like.

Based on the training of the neural network 108 with one or more haptic interaction profiles based on the sensor data captured by the sensors 116 of the haptic vest 102 and/or the pre-training of the neural network 108 with one or more one or more haptic interaction profiles, the virtual interaction application 106 may be configured to provide a sensation of soft haptic touch, pressure, and feedback to the user 104 at one or more portions of the user's body through the haptic vest 102 during the utilization of one or more haptic applications that may be accessed by the user 104 that may be based on the one or more one or more haptic interaction profiles.

As such, with respect to the aforementioned illustrative example, during utilization of a virtual communication application by the user 104 to remotely and virtually communicate with the third party (at a later point in time), the haptic feedback learning dataset 130 may be accessed to retrieve one or more haptic interaction profiles to provide haptic feedback to the user 104 through the haptic vest 102 upon the user and/or the third party providing a hugging gesture through a graphical user interface of the virtual communication application. Such a virtual interaction may take place through the graphical user interface that may be provided to the user 104 through the computing system 122 as the haptic vest 102 is controlled to provide a sensation of soft haptic touch, pressure, and feedback to the user 104 at particular portions of the user's torso and back that may physically simulate the virtual hug provided by the third party.

II. The Virtual Interaction Application and Related Methods

Components of the virtual interaction application 106 will now be described according to an exemplary embodiment and with continued reference to FIG. 1. In an exemplary embodiment, the virtual interaction application 106 may be stored on the memory 128 and executed by the processor 124 of the external server 110. In another embodiment, the virtual interaction application 106 may be stored upon a memory (not shown) of the computing system 122 and may be executed by the computing system 122 that may be used by the user 104. In some embodiments, the virtual interaction application 106 may be stored upon a storage unit (not shown) of the haptic vest 102 and may be executed by the controller 112 of the haptic vest 102.

Figure 4:
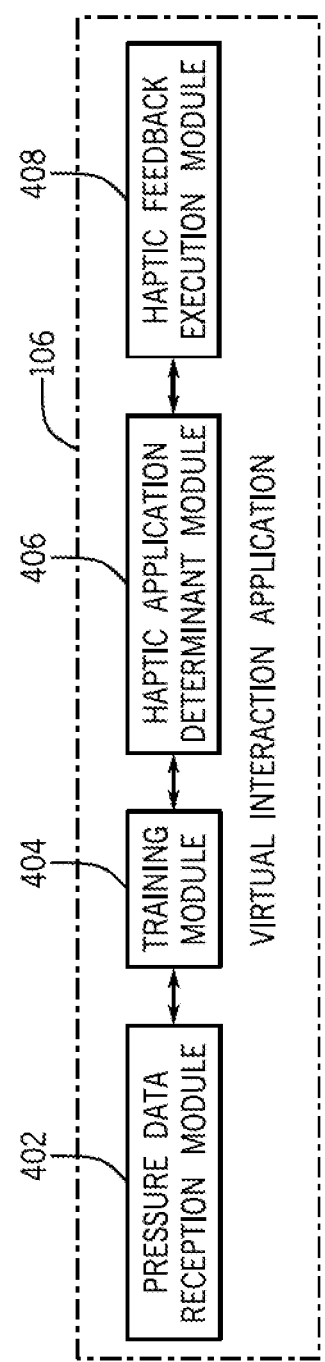
FIG. 4 is a schematic overview of a virtual interaction application according to an exemplary embodiment of the present disclosure.

FIG. 4 is a schematic overview of the virtual interaction application 106 according to an exemplary embodiment of the present disclosure. In an exemplary embodiment, the virtual interaction application 106 may include a plurality of modules 402-408 that may be configured to provide a large-area wearable soft haptic device for social-physical virtual interaction. The plurality of modules 402-408 may include a pressure data reception module 402, a training module 404, a haptic application determinant module 406, and a haptic feedback execution module 408. However, it is appreciated that the virtual interaction application 106 may include one or more additional modules and/or sub-modules that are included in lieu of the modules 402-408.

FIG. 5 is a process flow diagram of a method 500 for training the neural network 108 with one or more haptic interaction profiles based on data that is sensed by the sensors 116 of the haptic vest 102. FIG. 5 will be described with reference to the components of FIG. 1-FIG. 4 though it is to be appreciated that the method 500 of FIG. 5 may be used with other systems/components. The method 500 begins at block 502, wherein the method 500 may include receiving sensor data from the sensors 116.

In an exemplary embodiment, the pressure data reception module 402 of the virtual interaction application 106 may be configured to communicate with the controller 112 of the haptic vest 102 to obtain sensor data from the sensors 116 of the haptic vest 102 as the user 104 is wearing the haptic vest 102 during a real-time real-world interaction between the user 104 and a third party (e.g., individual). As discussed above, the sensors 116 of the haptic vest 102 are configured to sense and determine pressure sensing values that are associated with pressure that is applied to one or more portions of the haptic vest 102 at one or more points in time. For example, the sensors 116 may be configured to determine values associated with pressure that is applied to portions of the haptic vest 102 that is near the user's chest, stomach, upper back, and/or lower back that may be applied to the user 104 when receiving a hug from a third-party.

In one embodiment, upon sensing pressure sensing values based on pressure that is applied to one or more portions of the haptic vest 102, the sensor data may be communicated to the pressure data reception module 402. In addition to the pressure sensing values, the sensor data may additionally include an indication of the location of the pressure sensing values that pertain to pressure sensed at particular portions of the haptic vest 102.

The method 500 may proceed to block 504, wherein the method 500 includes analyzing the sensor data and processing a haptic interaction profile. In an exemplary embodiment, upon receiving the sensor data that includes the pressure sensing values sensed by the sensors 116 of the haptic vest 102 and the indication of the location of the pressure sensing values that pertain to pressure sensed at particular portions of the haptic vest 102, the pressure data reception module 402 may communicate respective data to the training module 404 of the virtual interaction application 106.

In an exemplary embodiment, the training module 404 may be configured to analyze the pressure sensing values sensed by the sensors 116 of the haptic vest 102 and the indication of the location of the pressure sensing values that pertain to pressure sensed at particular portions of the haptic vest 102. Based on the analysis of the pressure sensing values and the respective locations of pressure placed upon the haptic vest 102, the training module 404 may be configured to process a virtual pressure heat map that may pertain to levels of pressure that may be sensed by particular sensors 116 that are included at particular portions of the haptic vest 102 at a particular point in time.

Each haptic interaction profile that is based on the sensor data may processed to include data that pertains to the virtual pressure heat map and indicates particular locations of the haptic vest 102 that may be associated with particular levels of pressure that are received by the user 104 based on the social-physical interaction between the user 104 and the third party at particular points in time and/or for particular periods of time. Each of the haptic interaction profiles processed by the training module 404 may include an identification of particular pouches 120 and/or portions of the haptic vest 102 which may receive particular levels of pressure based on the real-time social-physical interaction between the user 104 and the third party.

Such an identification may be completed based on identification of particular regions of the haptic vest 102 that may be close to particular portions of the user's body (e.g., torso, back), identification of particular sensors 116 that are sensing particular levels of pressure (e.g., by region, identification number, etc.), and/or identification of particular pouches 120 that are affixed or in proximity to particular sensors that are sensing particular levels of pressure (e.g., by region, identification number, etc.).

In one or more embodiments, one or more haptic interaction profiles may also be processed with data that may include one or more sensed gestures that may be provided by the third party. As an illustrative example, the haptic interaction profiles may include data that pertain to pressure sensing values that may be sensed by one or more particular sensors 116 of the haptic vest 102 at particular portions of the haptic vest 102 as a third party hugs the user 104 in real-time. Such data may additionally include data that may be annotated with respect to the third party, a description of the third party, characteristics associated with the third party, and the like. Such annotations may be completed manually by the user 104 through a graphical user interface of the virtual interaction application 106 that may be presented to the user 104 through the computing system 122.

The method 500 may proceed to block 506, wherein the method 500 may include training the neural network 108 with the haptic interaction profile. In an exemplary embodiment, upon processing the haptic interaction profile, the training module 404 may be configured to access the neural network 108. Upon accessing the neural network 108, the training module 404 may be configured to populate the haptic feedback learning dataset 130 with the one or more haptic interaction profiles that pertain to the social-physical interaction between the user 104 and the third party as processed by the training module 404 (at block 504). For example, the neural network 108 may be trained with haptic interaction profiles that pertain to the social-physical interaction between the user 104 and the third party that pertains to the levels of pressure that may be applied by the third party and sensed by the sensors 116 of the haptic vest 102 upon the user's body at one or more points of time as the third-party hugs the user 104 in real-time.

FIG. 6 is a process flow diagram of a method 600 for controlling the haptic vest 102 to provide haptic feedback to the user 104 according to an exemplary embodiment of the present disclosure. FIG. 6 will be described with reference to the components of FIG. 1-FIG. 4 though it is to be appreciated that the method 600 of FIG. 6 may be used with other systems/components. The method 600 may begin at block 602, wherein the method 600 may include analyzing data associated with a haptic application that is being used by the user 104.

In an exemplary embodiment, the haptic application determinant module 406 of the virtual interaction application 106 may be configured to communicate with the computing system 122 that may be used by the user 104 to determine if the computing system 122 is executing a particular haptic application that may be used by the user 104. As discussed above, haptic applications may include, but may not be limited to, various virtual reality applications that pertain to virtual real-world experiences, various virtual robotic applications that pertain to human to robotic interactions, various virtual communication applications that pertain to human to human remote communications, various virtual gaming applications that pertain to various gaming genres, various vehicular applications that may provide feedback to a driver or passengers, various simulation type applications that pertain to the virtual simulation of real-world experiences.

In one embodiment, the computing system 122 may provide data associated with the particular haptic application that may be used by the user 104 at a particular point in time. In another embodiment, the haptic application determinant module 406 may also be configured to communicate with the neural network 108 to use machine learning/deep learning techniques to analyze data associated with sensed movements of the user 104 that may be sensed by the sensors 116 of the haptic vest 102 to determine particular interactions of the user 104 that may pertain to the particular haptic application that may be used by the user 104 at the particular point in time.

The method 600 may proceed to block 604, wherein the method 600 may include analyzing at least one haptic interaction profile. In an exemplary embodiment, the virtual interaction application 106 may be configured to present a haptic interface graphical user interface input icon that may be presented as the user 104 uses one or more haptic applications. The haptic interface graphical user interface input icon may be presented at a portion of the graphical user interface of the haptic application that is being used by the user 104 through the computing system 122.

The graphical user interface input icon may be inputted by the user 104 to enable the user 104 to actuate a particular type of haptic feedback that may pertain to the particular interactions of the user 104 as the user 104 is using particular haptic application. Upon the inputting of the graphical user interface input icon, the user 104 may be presented with a graphical user interface that allows the user 104 to select one or more haptic interaction profiles to be executed that may pertain to a previously trained real-world/real-time social-physical interaction between the user 104 and a third party and/or one or more haptic interaction profiles that may pertain to a particular social-physical interaction between the user 104 and elements, features, functions, and/or virtual interactions of one or more particular haptic applications.

As an illustrative example, if the user is using a virtual communication application and is providing a movement that pertains to a hugging interaction that may be sensed by the sensors 116 of the haptic vest 102 or determined based om image(s) captured of the user 104 through camera(s) associated with the computing system 122, the haptic application determinant module 406 may be configured to communicate with the computing system 122 and the neural network 108 to determine that the user 104 is using the virtual communication application and is provided a hugging interaction. The user 104 may be able select one or more haptic interaction profiles that may have been previously trained to the neural network 108 (at block 506) that pertain to the social-physical hugging interaction between the user 104 and the third party. As discussed, the one or more haptic interaction profiles may pertain to the level of pressure that may be applied by the third party and sensed by the sensors 116 of the haptic vest 102 upon the user's body during the real-time hug between the third party to the user 104.

In an exemplary embodiment, if one or more haptic interaction profiles are selected by the user 104 that were previously trained based on sensor data received from the sensors 116 of the haptic vest 102, the haptic application determinant module 406 may be configured to communicate with the neural network 108 to access the haptic feedback learning dataset 130 to retrieve the one or more particular haptic interaction profiles. Upon communication of the haptic interaction profiles by the neural network 108, the haptic application determinant module 406 may be configured to analyze the haptic interaction profiles. The haptic application determinant module 406 may determine data that pertains to particular locations of the haptic vest 102 that may be associated with particular levels of pressure that were received by the user 104 based on the prior real-time social-physical interaction between the user 104 and the third party. The haptic application determinant module 406 may also be configured to determine an identification of particular pouches 120 and/or portions of the haptic vest 102 that may include particular levels of pressure that are to be provided to the user 104 based on the real-time social-physical physical interaction between the user 104 and the third party.

If the haptic profile that is selected by the user 104 was pre-trained to the neural network 108, the haptic application determinant module 406 may be configured to analyze the haptic profile to determine data that pertains particular locations of the haptic vest 102 that may be associated with particular levels of pressure that are to be provided to the user 104 when virtually interacting with the elements, features, functions of particular haptic application being used by the user 104 (as executed by the computing system 122). The haptic application determinant module 406 may also be configured to determine an identification of particular pouches 120 and/or portions of the haptic vest 102 that may include particular levels of pressure that may be provided to the user 104 to indicate the type of haptic application, one or more features of the haptic application, one or more functions of the haptic application, one or more virtual interactions within the haptic application, and the like.

The method 600 may proceed to block 606, wherein the method 600 may include controlling one or more actuators to provide haptic feedback to the user 104 based on at least one haptic interaction profile. In an exemplary embodiment, upon analyzing the one or more haptic interaction profiles, the haptic application determinant module 406 may communicate data pertaining the identification of particular pouches 120 and/or portions of the haptic vest 102 that may include particular levels of pressure that may be provided to the user 104 to the haptic feedback execution module 408 of the virtual interaction application 106.

In an exemplary embodiment, the haptic feedback execution module 408 may be configured to analyze the data associated with the identification of particular pouches 120 and/or portions of the haptic vest 102 that may include particular levels of pressure that may be provided to the user 104 as derived from each particular haptic interaction profile and may send one or more electronic command signals to the controller 112 of the haptic vest 102 to enable haptic feedback to be provided to the user 104 that is wearing the haptic vest 102 that is based on the respectively selected haptic interaction profile(s).

In particular, haptic feedback execution module 408 may be configured to send one or more non-transitory computer implemented electronic command signals to the controller 112 of the haptic vest 102 to enable haptic feedback to be provided to the user 104 that may be based on one or more haptic interaction profiles previously trained to the neural network 108. Based on the sending of electronic command signals to the controller 112 of the haptic vest 102, the haptic vest 102 may be controlled to enable the haptic vest 102 to provide haptic feedback to particular portions of the user's body based on the operation of the pressure regulator 202, the 5/3-way valve 204, and the solenoid valves 118 to thereby selectively inflate and deflate one or more of the secondary layer of haptic pouches 304 that may be disposed at one or more portions of the haptic vest 102 as the haptic vest 102 conforms to the body of the user 104 based on actuation of the primary layer of inflatable pouches 302. This functionality may provide one or more levels of pressure to particular portions of the user's body to match the levels of pressure included within the haptic interaction profiles previously trained to the neural network 108 by the virtual interaction application 106 and/or pre-trained to the neural network 108.

Accordingly, the user 104 may be provided with a sensation of soft haptic touch, pressure, and feedback at one or more portions of the user's body through the haptic vest 102 that may be based on one or more haptic interaction profiles that may pertain to the social-physical interaction between the user 104 and a third party and/or one or more pretrained haptic profiles that may pertain to particular social-physical interaction between the user 104 and elements, features, functions, and/or virtual interactions of one or more haptic applications.

Referring again to the aforementioned illustrative example, the haptic vest 102 may thereby be controlled to provide a soft haptic stimulation to the user 104 that may resemble a sensation of soft haptic touch, pressure, and feedback to the user 104 at one or more portions of the user's body through the haptic vest 102 that may pertain to the social-physical interaction between the user 104 and the third party that may resemble a physical hug that may be provided to the user 104 by the third party as the third party communicates with the user 104 virtually through a virtual communication application that is executed by the computing system 122.

In additional embodiments, the haptic feedback execution module 408 may be configured to provide a graphical user interface or overlaying graphics to the user through the computing system 122 that may provide a visual indication such as a virtual pressure heat map that pertains to the soft haptic touch, pressure, and feedback that may be provided to the user 104 through the haptic vest 102. In one or more embodiment, the sensors 116 may be also configured to provide closed loop control on the pressure of the pouches 120 to determine if the pouches 120 are being controlled or not being controlled to inflate and deflate in accordance with one or more haptic interaction profiles and may send signals to the haptic feedback execution module 408 to send one or more commands to modulate an amount of pressure that may be provided at one or more portions of the haptic vest 102 based on the inflation and/or deflation of one or more particular pouches 120.

Figure 7:
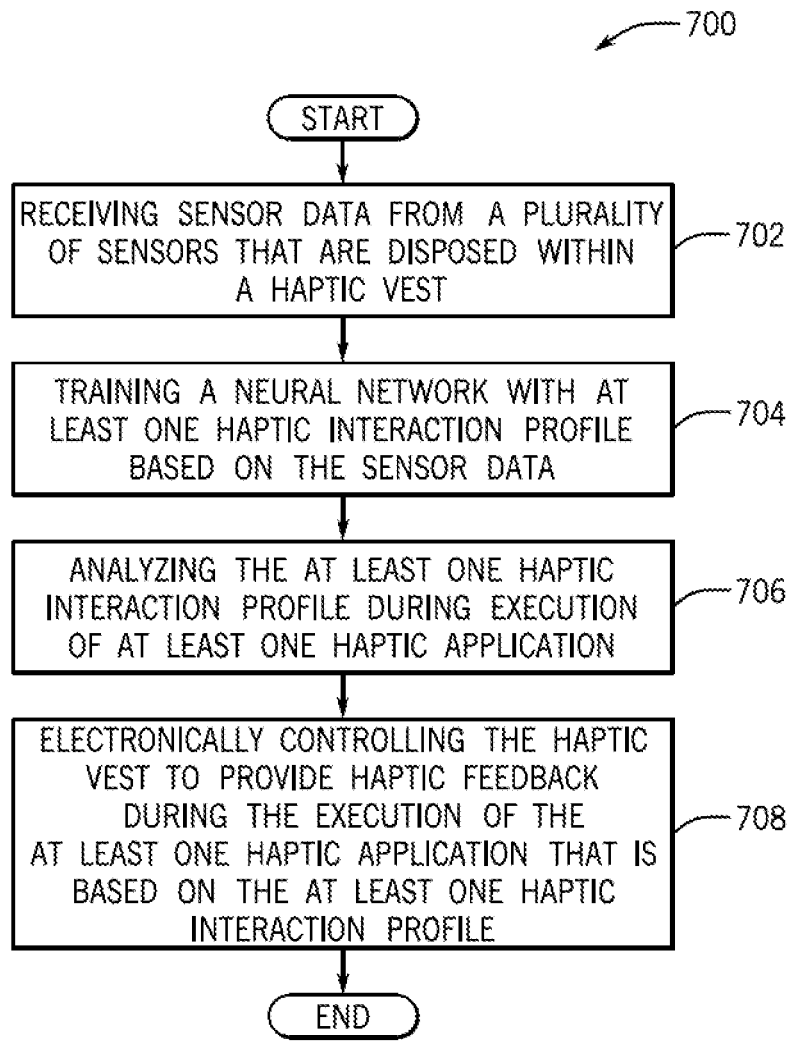
FIG. 7 is process flow diagram of a method for providing a large-area wearable soft haptic device for social-physical virtual interaction according to an exemplary embodiment of the present disclosure.

FIG. 7 is a process flow diagram of a method for social-physical haptic interaction according to an exemplary embodiment of the present disclosure. FIG. 7 will be described with reference to the components of FIG. 1-FIG. 4 though it is to be appreciated that the method 700 of FIG. 7 may be used with other systems/components. The method 700 may begin at block 702, wherein the method 700 may include receiving sensor data from a plurality of sensors 116 that are disposed within a haptic vest 102. In one embodiment, the sensor data includes pressure sensing values that pertain to pressure that is applied to particular portions of the haptic vest 102.

The method 700 may proceed to block 704, wherein the method 700 may include training a neural network 108 with at least one haptic interaction profile based on the sensor data. The method 700 may proceed to block 706, wherein the method 700 may include analyzing the at least one haptic interaction profile during execution of at least one haptic application. The method 700 may proceed to block 708, wherein the method 700 may include electronically controlling the haptic vest 102 to provide haptic feedback during the execution of the at least one haptic application that is based on the at least one haptic interaction profile.

It should be apparent from the foregoing description that various exemplary embodiments of the invention may be implemented in hardware. Furthermore, various exemplary embodiments may be implemented as instructions stored on a non-transitory machine-readable storage medium, such as a volatile or non-volatile memory, which may be read and executed by at least one processor to perform the operations described in detail herein. A machine-readable storage medium may include any mechanism for storing information in a form readable by a machine, such as a personal or laptop computer, a server, or other computing device. Thus, a non-transitory machine-readable storage medium excludes transitory signals but may include both volatile and non-volatile memories, including but not limited to read-only memory (ROM), random-access memory (RAM), magnetic disk storage media, optical storage media, flash-memory devices, and similar storage media.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

It will be appreciated that various implementations of the above-disclosed and other features and functions, or alternatives or varieties thereof, may be desirably combined into many other different systems or applications. Also, that various presently unforeseen or unanticipated alternatives, modifications, variations or improvements therein may be subsequently made by those skilled in the art which are also intended to be encompassed by the following claims.

The invention claimed is:

1. A system for social-physical haptic interaction comprising:
    a vest that includes a controller that is included as part of the vest and is operably connected to a plurality of solenoid valves that are respectively associated with inflatable pouches;
    an air pressure regulator that is connected to the solenoid valves through a 5/3-way valve to inflate the inflatable pouches; and
    a plurality of sensors that are integrated within the vest that are configured to collect pressure sensing values that pertain to pressure that is applied to particular portions of the vest to train a neural network to learn at least one haptic interaction profile, wherein the controller is configured to provide signals to inflate the inflatable pouches and deflate the inflatable pouches to provide haptic feedback based on the at least one haptic interaction profile.

2. The system of claim 1, wherein a vacuum is connected to the solenoid valves through a 5/3-way valve to selectively deflate the inflatable pouches, wherein the inflatable pouches are configured in an array to apply compression.

3. The system of claim 2, wherein the vest is configured as a soft wearable device that includes a first layer of pouches that are distal to a subject that is utilizing the vest and inflatable to conform the pouches to the subject.

4. The system of claim 3, wherein the vest includes a second layer of pouches that are smaller in size than the first layer of pouches and are stacked upon the first layer of pouches proximal to the subject, wherein the second layer of pouches are configured to provide levels of pressure to at least one portion of the subject.

5. The system of claim 4, wherein the at least one haptic interaction profile is trained to the neural network based on at least one of: sensor data that is captured by the plurality of sensors during a social-physical interaction with a third-party and based on a pre-trained interaction with an element, feature, and function of at least one haptic application.

6. The system of claim 5, wherein the at least one haptic application includes at least one of: a virtual reality application that pertains to virtual real-world experiences, a virtual robotic application that pertains to human to robotic interactions, a virtual communication application that pertains to human to human remote communications, a virtual gaming application that pertains to a gaming genres, a vehicular application that provides feedback to a driver or passenger, a simulation type application that pertains to a virtual simulation of real-world experiences.

7. The system of claim 5, wherein respective digital high or low signals are sent to the solenoid valves to inflate the inflatable pouches and deflate the inflatable pouches of the second layer of pouches to provide a haptic stimulation that resembles a sensation of soft haptic touch, pressure, and feedback through the vest.

8. The system of claim 7, wherein a computing system is controlled to provide a visual indication that pertains to the soft haptic touch, pressure, and feedback through the vest.

9. The system of claim 7, wherein the plurality of sensors are configured to provide a closed loop control on the pressure of the inflatable pouches and are configured to determine if the inflatable pouches are being controlled to inflate and deflate based on the at least one haptic interaction profile.

10. A computer-implemented method for social-physical haptic interaction comprising:
- receiving sensor data from a plurality of sensors that are disposed within a haptic vest, wherein the sensor data includes pressure sensing values that pertain to pressure that is applied to particular portions of the haptic vest;
- training a neural network to learn at least one haptic interaction profile based on the sensor data;
- analyzing the at least one haptic interaction profile during execution of at least one haptic application; and
- electronically controlling the haptic vest to provide haptic feedback during the execution of the at least one haptic application that is based on the at least one haptic interaction profile.

11. The computer-implemented method of claim 10, wherein the haptic vest is configured as a soft wearable device that includes a first layer of pouches that are distal to a subject that is utilizing the haptic vest and are inflatable to conform the haptic vest to the subject to allow a second layer of pouches that are stacked upon the first layer of pouches to sense the pressure sensing values, wherein the plurality of sensors are attached to the second layer of pouches.

12. The computer-implemented method of claim 11, further including analyzing the sensor data and processing the at least one haptic interaction profile, wherein the sensor data additionally includes an indication of a location of the pressure sensing values that pertain to pressure sensed at particular portions of the haptic vest.

13. The computer-implemented method of claim 12, wherein analyzing the sensor data and processing the at least one haptic interaction profile includes analyzing the pressure sensing values sensed by plurality of sensors of the haptic vest and the indication of the location of the pressure sensing values that pertain to pressure sensed at particular portions of the haptic vest and processing a virtual pressure heat map.

14. The computer-implemented method of claim 13, wherein the virtual pressure heat map pertains to levels of pressure that are sensed by particular sensors of the plurality of sensors that are included at particular portions of the haptic vest at a particular point in time.

15. The computer-implemented method of claim 14, wherein the at least one haptic interaction profile is based on at least one of: data that pertains to the virtual pressure heat map and indicates particular locations of the haptic vest that are associated with particular levels of pressure that are received based on a social-physical interaction with a third party at the particular point in time and a pre-trained interaction with an element, feature, and function of at least one haptic application.

16. The computer-implemented method of claim 15, wherein analyzing the at least one haptic interaction profile includes determining the at least one haptic application that is being used and communicating with the neural network to access the at least one haptic interaction profile, wherein the at least one haptic interaction profile is analyzed to determine an identification of particular solenoid valves, pouches, and portions of the haptic vest that include particular levels of pressure that are to be provided.

17. The computer-implemented method of claim 16, wherein electronically controlling the haptic vest includes sending digital high or low signals to the solenoid valves of the haptic vest to inflate the pouches and deflate the pouches of the second layer of pouches to provide a soft haptic stimulation that resembles a sensation of soft haptic touch, pressure, and feedback through the haptic vest.

18. The computer-implemented method of claim 17, further including sensing an inflation pressure of the pouches to determine if the inflatable pouches are being controlled to inflate and deflate based on the at least one haptic interaction profile.

19. A non-transitory computer readable storage medium storing instruction that when executed by a computer, which includes a processor perform a method, the method comprising:
- receiving sensor data from a plurality of sensors that are disposed within a haptic vest, wherein the sensor data includes pressure sensing values that pertain to pressure that is applied to particular portions of the haptic vest;
- training a neural network to learn at least one haptic interaction profile based on the sensor data;
- analyzing the at least one haptic interaction profile during execution of at least one haptic application; and
- electronically controlling the haptic vest to provide haptic feedback during the execution of the at least one haptic application that is based on the at least one haptic interaction profile.

20. The non-transitory computer readable storage medium of claim 19, wherein electronically controlling the haptic vest includes sending digital high or low signals to inflate pouches of the haptic vest and deflate the pouches of the haptic vest to provide a soft haptic stimulation that resembles a sensation of soft haptic touch, pressure, and feedback through the haptic vest.

* * * * *